United States Patent [19]

Boddeker et al.

[11] 4,115,274
[45] Sep. 19, 1978

[54] APPARATUS FOR DESALINATING WATER BY REVERSE OSMOSIS

[75] Inventors: Karl W. Böddeker, Hamburg; Walter Hilgendorff, Tespe, both of Fed. Rep. of Germany

[73] Assignee: Gesellschaft für Kernenergieverwertung in Schiffbau und Schiffahrt mbH., Geesthacht-Terperhude, Fed. Rep. of Germany

[21] Appl. No.: 750,156

[22] Filed: Dec. 13, 1976

[30] Foreign Application Priority Data

Dec. 13, 1975 [DE] Fed. Rep. of Germany ....... 2556210

[51] Int. Cl.² .................... B01D 13/00; C02B 1/82
[52] U.S. Cl. ................... 210/321 R; 210/346; 210/433 M; 210/488
[58] Field of Search ............ 210/321 R, 346, 433 M, 210/488, 321 A

[56] References Cited

U.S. PATENT DOCUMENTS 3,847,818  11/1974  Madsen et al. ............... 210/321 R
3,872,015  3/1975  Madsen ........................ 210/346

Primary Examiner—Charles N. Hart
Assistant Examiner—David R. Sadowski
Attorney, Agent, or Firm—Walter Becker

[57] ABSTRACT

Apparatus for desalinating water by reverse osmosis, having a series of porous discs each covered on both sides by a membrane, and compressed at their edges between respective pairs of a stack of module plates which are identical and which each consist of two mirror image halves, alternate module plates in the stack being rotated through 180°. A zig-zag flow path through the stack is thereby provided with desalinated water passing by reverse osmosis into the porous discs and hence radially outward of the stack for collection.

14 Claims, 6 Drawing Figures

APPARATUS FOR DESALINATING WATER BY REVERSE OSMOSIS

The present invention relates to an apparatus for desalinating water by means of reverse osmosis having a stack or porous discs compressed at their edges between module plates to form a seal and provided at both sides with membranes, the respective edge portions of which discs serve as treated water outlets and which cooperate with shallow cut-outs provided at both sides of the module plates to delimit untreated water chambers of identical pressure and flow geometry, said chambers being connected in series between the untreated water inlet and the exhaust water or brine outlet by way of channels.

Such apparatus has basically proved itself but has the disadvantage that because of the lengthy flow path present in the tall module plate stacks and the diversions in the flow path, a relatively large flow resistance and hence a relatively large pressure loss is produced. A further disadvantage with earlier apparatus consists in that the plate stacks use two different module plates which are difficult to produce and which must be put together in pairs.

It is an object of the present invention to eliminate the above mentioned disadvantages and to provide a particularly economic construction which is simple to build, consists solely of identical module plates, saves considerable space and operates with lower pressure losses and higher efficiency.

These and other objects and advantages of the invention will appear more clearly from the following specification in connection with the accompanying drawings, in which.

Figure 1:
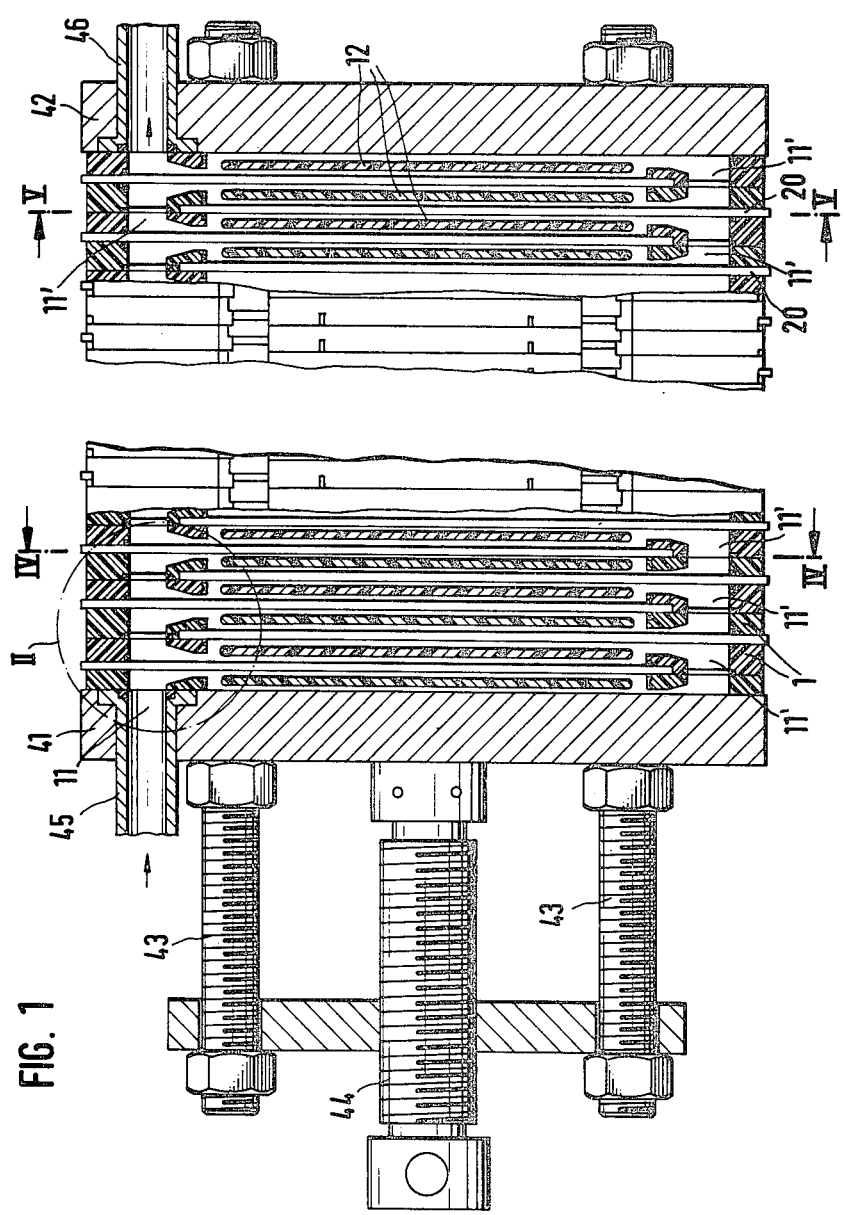
FIG. 1 is a part cross-sectional side view of a desalination apparatus in accordance with the invention.

The above objects have been solved in accordance with the invention by the fact that the module plates with reference to a diametrical profile, consist of two identical halves offset by 180° with respect to one another, and are stacked alternately offset by 180°, with membrane discs lying between them, that at the edge of the plate stack, connecting channels extending through the entire plate stack are arranged, parallel to the axis thereof and diametrically opposed, and that the membrane discs have portions of their edges alternately extending outwardly at opposed sides of the plate stack and subdivide the connecting channels into connecting channel portions.

Preferably the module plates are formed as dividing walls in their central region and between two neighboring membrane discs form two mutually separated chambers for receiving untreated water. The said chambers connect with the inlet and outlet sides. In this embodiment flow takes place through pairs of the untreated water chambers, so that the number of diversions, relative to the number of membranes over which flow takes place, is reduced to about half of the earlier proposal and the flow resistance is substantially reduced.

The desalination apparatus in accordance with the invention consists of a plurality of module plates 1 having membrane discs 20 arranged between them. The module plates and membrane discs are in a manner to be described in detail hereinafter united in a stack and compressed between two pressure plates 41 and 42. Four tie rods 43 arranged around the periphery of the stack serve to support and compress the disc stack. A threaded shaft 44 arranged between the tie rods 43 enables a simple compression of the stack of module plates 1 and membrane discs 20.

The individual membrane discs 20 comprise a porous plastic disc 21, preferably formed of sintered polyethylene, and membranes 22 and 23 arranged on both sides thereof. If desired, intermediate layers of filter paper can be provided between the membranes 22 and 23 and the porous membrane disc 21.

Figure 2:
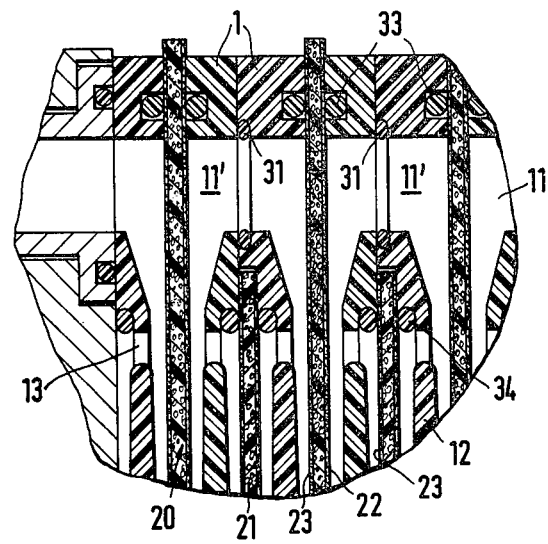
FIG. 2 shows the portion II of FIG. 1 on a larger scale.

As will be seen from FIGS. 1 and 2, all module plates 1 are identical to each other but are arranged in the plate stack alternately offset to each other by 180°. The membrane discs 20 arranged therebetween are similarly arranged in the plate stack alternately offset to each other by 180°, so that the membrane discs 20 lie alternately on two opposed sides of the plate stack.

The plate stack is traversed by a connecting channel 11 on two diametrically opposite peripheral regions. This connecting channel 11 is divided into connecting channel portions 11' by the outwardly projecting module plates, which portions are formed by two corresponding holes in the module plates 1. The central part of each module 1 is a dividing wall 12, while its upper surface forms with the corresponding neighboring membrane a large-area untreated water chamber.

Sealing rings of known type serve for sealing the disc stack. As shown in FIG. 2, a respective sealing ring 31 lies between both edges of the two neighboring module plates. Sealing rings 33, 34 serve to seal the module plates with respect to the membrane discs, and together with the sealing rings 31 insure that the untreated water flowing through the plate stack cannot escape from the desalination apparatus and mix with the desalinated treated water flowing off the outer sides of the plate stack. The sealing rings 33 and 34, which are identical, have a form corresponding to the offset arrangement of the membrane discs 20.

The apparatus in accordance with the invention has a flow path as follows. The water to be desalinated flows via an inlet fitting 45 provided in the pressure plate 41, into the desalination apparatus. The front face of the inlet fitting 45 is also sealed by a sealing ring with respect to the first module plate. The untreated water supplied to the desalination apparatus flows through the plate stack in a zig-zag path determined by the diversions or deflections. After it has entered the connecting channel portion 11', by way of the fitting 45 it flows downwards via the adjacent membrane disc and finally reaches a lower connecting channel portion 11'. Thereupon the untreated water again takes a path in opposite direction and divided by dividing wall 12 flows upwardly on both membrane discs 20 which are adjacent said membranes 22, 23 which in their turn face said dividing wall, and flows upwards to the next connecting channel portion 11'. In this connection it may be mentioned that the terms "upwards" and "downwards" refer only to the drawings, since — as will be explained hereinafter — it is possible so to arrange the desalination apparatus that the outwardly projecting edges of the membrane discs lie in the same horizontal plane. As mentioned, care must be taken with this zig-zag flow path of the untreated water to the effect that except in the region of the first and last module plates 1, the untreated water flow always divides into two paths. As will be seen from FIGS. 1 and 2, bores 13 and 14 are provided between the separating walls 12 of the module plates and the module plate portions which surround the inwardly lying membrane edges. The untreated water, each time after flowing through a connecting channel portion 11' is hence divided into two parallel paths, so that each of the upper surfaces of the membrane discs 20 neighboring the dividing wall 12 are contacted simultaneously. In this way, a substantial reduction of the flow resistance is achieved because of the lower number of diversions or deflections necessary in the plate stack. Thus, each membrane disc is at its opposite sides passed over in opposite directions. After leaving the last untreated water chamber, the untreated water, having an increased salt concentration, flows out by way of the brine or outlet fitting 46, which is secured in the pressure plate 42 in a manner similar to inlet fitting 45 and is sealed in the same manner. Because of the symmetrical construction of the plate stack, the flow through may also take place in the opposite direction. During the flow of the untreated water through the desalination apparatus, desalinated water soaks through the membrane surfaces into the porous plate 21 of the individual membrane discs 20 and flows out of the edges of the membrane discs 20 projecting from the plate stack, and can then be collected as desalinated treated water.

The module plates according to the invention can be produced by injection molding. Such production is particularly economical in that only a single type of plate is employed and thereby only a single injection mold is needed. The end module plates located adjacent the pressure plates 41 and 42 require no special development, it merely being necessary slightly to machine the normal module plate adjacent the pressure plate 41 in order to be able to employ it as the end plate. Since the two module plates are substantially thinner, less material is necessary and hence the cost is substantially reduced. It is also of particular importance that the specific space requirement for the desalination apparatus has been reduced. Assuming an installation cross section of 30 × 30 cm for the apparatus (including the tie rods 43 and the tank for the treated water surrounding the plate stack) the specific space requirement for the desalination apparatus is only 0.03 m$^3$ per m$^2$ of membrane surface to be acted upon. With an overall length of 160 cm, the desalination apparatus has an installed membrane surface of 5 m$^2$. Because — as previously explained — the untreated water flow is divided into two paths, the diversions or deflections which substantially contribute to the flow resistance are reduced by about one half.

Figure 5:
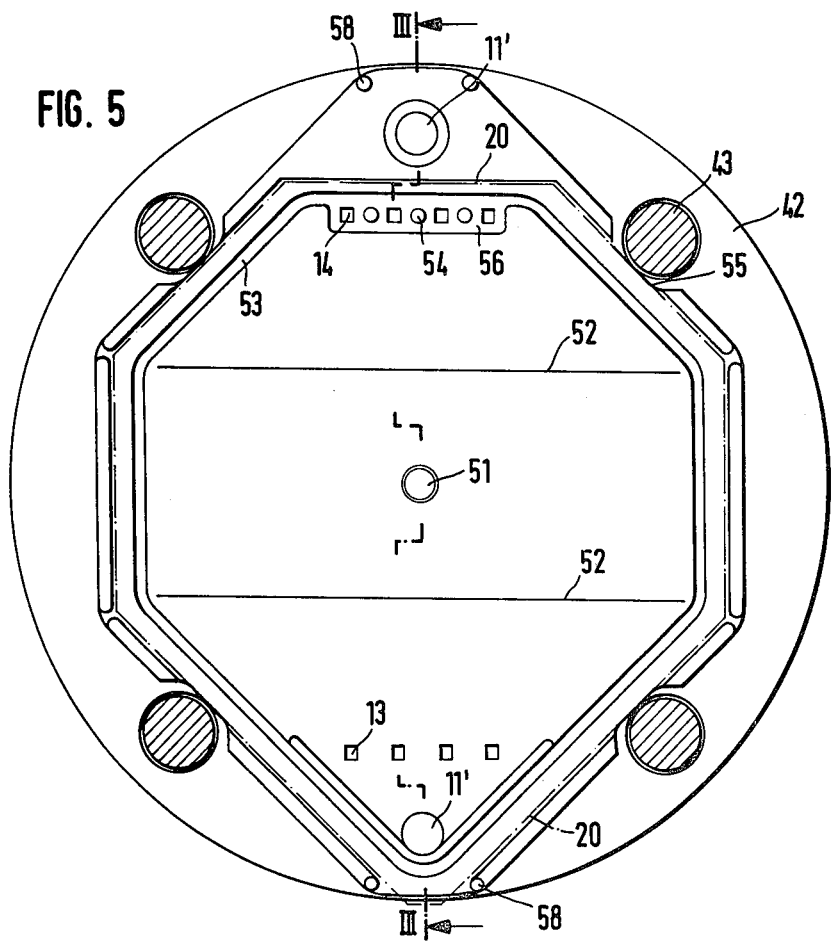
FIG. 5 is a side view of the left hand side of FIG. 3.
Figures 3, 4, 6:
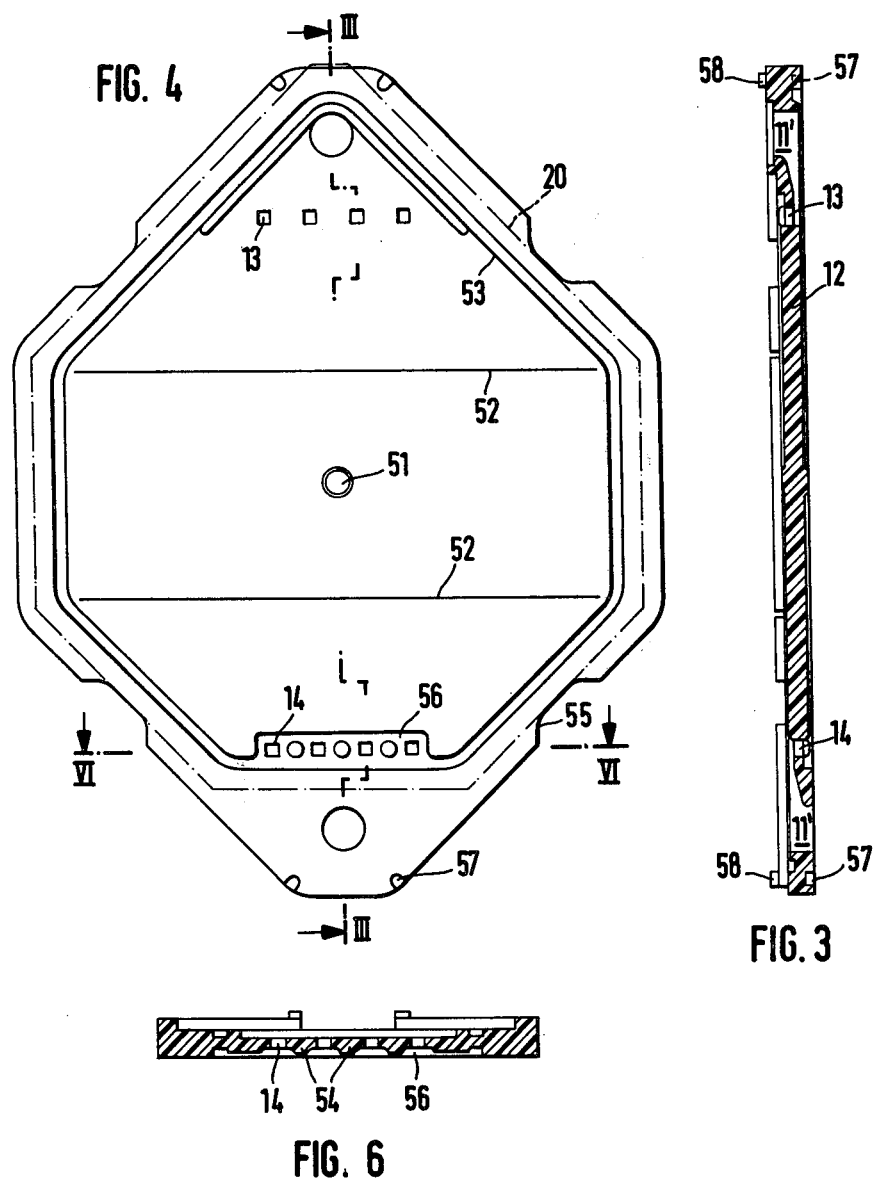
FIG. 3 is an axial transverse section through a module plate formed in accordance with the invention.
FIG. 4 is a side view of the right hand side of FIG. 3.
FIG. 6 is a section in accordance with the sectional lines VI—VI of FIG. 4.

Referring now to FIGS. 3-6, these figures show a specific preferred embodiment of a module plate according to the invention. As will be seen from FIG. 3, both halves of a module plate are identical with respect to a transverse central plane; they are merely turned in the diametrical transverse plane by 180°. For manufacturing reasons and also for the sake of a simplified assembly, the module plates 1 have a polygonal cross section (see FIGS. 4 and 5). The central portion of each module plate 1 forms the above mentioned dividing wall 12 which on its opposed sides is roof-shaped. On both sides of the central portion of the module plate 1, there is formed a small circular abutment 51 which when the plate stack is clamped together abuts a respective membrane disc 20. The central portion of the module plate 1 is planar up to the edges indicated at 52 in FIG. 4. On each side of edge 52, the dividing wall surface tapers slightly in an outward direction up to the bores 13 and 14 provided at the edges of the dividing wall. As shown in FIGS. 4 and 5, these bores 13 have a rectangular cross section, because in the injection molding process can be much easier produced due to the rectangular projections in the mold. This is also true of bores 14 on the opposite side of the module plate 1. A comparison of FIG. 4 with FIG. 5 shows that both sides of the module plate are identical but turned through 180° with respect to each other. Beyond the bores 13 and 14, the module plate 1 extends to the connecting channel portions 11'. In this region, the seals 31 and 33, 34 are located, which engage the adjacent module plate 1 or membrane disc 20. The outer peripheral area of the module plate 1 to each side of bores 13, is bevelled towards connecting channel portion 11' to assist in reducing flow resistance, as shown in the upper part of FIG. 3. That portion of module plate 1 which lies outside the connecting channel portion 11' comprises edge seals 33, 34 in core in corresponding peripheral drain channels 53. It is further to be noted that in order to enlarge the flow through cross-section, a plurality of bores 13 and 14 are provided adjacent each other. The bores 14 are located in drain channel 56.

Because of the by 180° turned symmetry of both module plate halves, the rim portion between the dividing wall 12 and the connecting channel portion 11' to each side of the bores 14 is bevelled on the left side, whereas on the opposite right side a planar abutment surface is provided for the neighboring module plate 1 (see FIG. 3). By means of sealing ring 31, which surrounds the connecting channel portion 11', the neighboring module plates 1 are sealed in the region of this contact surface. Between the four rectanglar bores 14 there are located small circular abutments 54 which can additionally support the membrane disc 20. FIG. 4 shows in dash lines the edge of a membrane disc 20 which also has a polygonal cross section. As is also shown in FIG. 4, the lower edge of membrane disc 20 ends a short distance ahead of the perforation in the outer part of module plate 1, so that the connecting channel portion 11' is not closed off. On the other hand, in the upper region the membrane disc 20 extends beyond the bores 13 in spaced relationship thereto, and lies flush over the cross section of the upper connecting channel portion 11', finally (top of FIG. 4) projecting from between the module plates. As will be seen from FIG. 5, the left surface (with regard to FIG. 3) of the module plate, is formed complementarily. In this instance only the upper and lower limits of the membrane disc 20 are indicated by a dot-dash line. In FIG. 5, the tie rods 43 and the pressure plates 42 at the end of the stack are also shown. These tie rods 43 when in assembled condition rest in recesses 55, provided on the four long sides of the module plates, where they lie immediately against the edges of the membrane discs 20. The combination of the module plates and membrane discs is thereby quite substantially simplified as the alignment is automatically effected.

On opposed sides of the module plates, projections 58 and correspondingly formed recesses 57 may optionally be provided, so that the module plates are positively kept in alignment with each other.

The flow of untreated water through the module plate stack will now be described with reference to FIGS. 3 to 6. Assuming that the untreated water flow, with reference to FIG. 3, enters the connecting channel section 11' at the top on the left hand side, the untreated water flows at the right and left sides of the dividing wall 12 downwards through the untreated water chambers delimited on the one hand by the outer surfaces of dividing wall 12 and on the other hand by the membrane discs 20 to the right and left of said dividing wall. Because the untreated water chambers decrease in height towards their central sections and thereafter increase again in height, a good distribution of untreated water occurs over the total membrane surface. This untreated water flow divides at the bores 13, so that one half flows along the membrane lying to the right, and the untreated water flowing through the bores 13 acts upon the upper membrane surface to the left of dividing wall 12. Thus, with regard to one dividing wall 12, the two flow paths are directed in the same direction, whereas the flows acting upon the outer surfaces of the membrane discs flow with each individual membrane disc in opposite directions. At the lower end of dividing wall 12, the two untreated water paths unite again and flow into the lower connecting channel portion 11', so as, by way of this connecting channel portion, to reach the next following pair of untreated water chambers. This succeeding flow through the next pair of untreated water chambers naturally takes place in the opposite direction. The desalinated water penetrating through the membranes travels through the porous plate 21 of the membrane disc 20. As will be seen from the limits of the edges of the membrane discs 20 shown in FIG. 4, the treated water can escape over a very large circumferential area and can then be collected in a bath surrounding the module stack.

It is, of course, to be understood that the present invention is, by no means, limited to the specific showing in the drawings, but also comprises any modifications within the scope of the appended claims.

What we claim is:

1. An apparatus for desalinating water by reverse osmosis, which includes a first pressure plate having inlet means for the water to be desalinated, a second pressure plate arranged opposite and in spaced relationship to said first pressure plate and provided with outlet means for the brine of the desalinated water, a stack of substantially identical module plates arranged between said first and second pressure plates but with each two adjacent module plates arranged so as to complement each other, a plurality of porous disc means covered on opposite sides with membranes and each having a peripheral outlet section forming an outlet for desalinated water, said disc means being clamped between respective adjacent module plates in such a way that every two adjacent porous disc means have their peripheral outlet sections angularly offset about a common axis, clamping means operatively connected to said pressure plates for clamping said module plates therebetween and thereby said disc means between module plates, said disc means together with adjacent module plates defining equal pressure and equal flow-geometric water chambers for receiving water to be desalinated, said chambers being arranged in series with regard to each other and fluid conveying means establishing communication with said inlet and outlet means, said porous disc means being sandwiched with said fluid conveying means so as to force fluid passing from said inlet means to said outlet means to flow around said porous disc means alternately in opposite direction, those surfaces of the module plate dividing walls which define the regions of the floor of said water chambers having a roof-shaped profile, the ridge portion of said roof-shaped profile being located transversely and centrally between said inlet and outlet means.

2. An apparatus according to claim 1, in which the angular offset of said peripheral outlet sections of each two adjacent porous disc means is about 180°.

3. An apparatus according to claim 1, in which the module plates comprise respective central dividing walls, dividing said chambers into two regions sandwiched with different ones of said two membrane discs of said porous disc means.

4. An apparatus according to claim 1, in which said module plates are provided with seals for cooperation with the peripheries of adjacent membrane discs.

5. An apparatus according to claim 3, in which said module plates are provided with respective transverse bores positioned outwardly of said respective dividing wall to permit passage of water into and out of said two regions.

6. An apparatus according to claim 5, in which each of said module plates is provided with a depressed groove, and in which the bores of the module plates are arranged in groups in said depressed grooves.

7. An apparatus according to claim 6, in which in the region of said groove between the individual bores abutment for the membranes and seals are provided.

8. An apparatus according to claim 7, in which said bores have a rectangular contour.

9. An apparatus according to claim 8, in which the plate stack is so arranged that the peripheral portions of the membrane discs extending from the stack are located in the same plane.

10. An apparatus according to claim 1, in which the module plates have a substantially multiple side contour, and in which said clamping means include tie rods arranged in the region of the multiple sides.

11. An apparatus according to claim 10, in which in the region of said tie rods cut-outs is provided in the module plates so that said membrane discs can be directly supported by said tie rods.

12. An apparatus according to claim 1, in which said module plates are formed in one piece of an injection moldable material.

13. An apparatus according to claim 1, in which in the center of said ridge portion of the surfaces of said module plate dividing walls abutments are provided for engagement with said membrane discs.

14. An apparatus according to claim 1, in which sealing rings are provided between all rim surfaces of said module plates and said membranes.

* * * * *